(12) United States Patent
Boina

(10) Patent No.: US 12,175,526 B2
(45) Date of Patent: Dec. 24, 2024

(54) BANKING KIT

(71) Applicant: JPMorgan Chase Bank, N.A., New York, NY (US)

(72) Inventor: Satyam Boina, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 23 days.

(21) Appl. No.: 18/076,258

(22) Filed: Dec. 6, 2022

(65) Prior Publication Data

US 2024/0185334 A1   Jun. 6, 2024

(51) Int. Cl.
*G06Q 40/00* (2023.01)
*G06Q 40/02* (2023.01)
*H04L 67/5683* (2022.01)

(52) U.S. Cl.
CPC .......... *G06Q 40/02* (2013.01); *H04L 67/5683* (2022.05)

(58) Field of Classification Search
CPC ..... G06Q 40/00; G06Q 40/02; H04L 67/5683
See application file for complete search history.

(56) References Cited

U.S. PATENT DOCUMENTS

| | | | | |
|---|---|---|---|---|
| 11,798,072 | B1* | 10/2023 | Hockey | G06Q 40/12 |
| 2022/0269776 | A1* | 8/2022 | Nalluri | G06F 21/577 |
| 2022/0358508 | A1* | 11/2022 | Pandillapalli | G06Q 20/389 |
| 2022/0391927 | A1* | 12/2022 | Jain | H04L 63/1441 |
| 2023/0107805 | A1* | 4/2023 | Summer | H04L 9/3236 |
| | | | | 713/176 |
| 2023/0246852 | A1* | 8/2023 | Lupowitz | H04L 9/50 |
| | | | | 713/162 |
| 2024/0020779 | A1* | 1/2024 | Larsen | H04L 9/0825 |
| 2024/0029057 | A1* | 1/2024 | Thibadeau, Sr. | G06Q 20/3678 |

FOREIGN PATENT DOCUMENTS

CN   114004687 A   *  2/2022

OTHER PUBLICATIONS

Improving banking transactions using blockchain technology S Sakho, Z Jianbiao, F Essaf . . . - 2019 IEEE 5th . . . , 2019— ieeexplore.ieee.org (Year: 2019).*

* cited by examiner

*Primary Examiner* — Lalita M Hamilton
(74) *Attorney, Agent, or Firm* — Greenblum & Bernstein, P.L.C.

(57) ABSTRACT

Implementations generally relate to a banking kit. In some implementations, a method includes creating at least one cloud account of a plurality of cloud accounts, where the at least one cloud account is associated with an end user. The method further includes storing user data associated with the end user in a database associated with the end user. The method further includes enabling a client device associated with the end user to access the cloud account. The method further includes enabling a bank server to access the cloud account.

17 Claims, 9 Drawing Sheets

BANKING KIT

BACKGROUND

Financial technology (Fintech) is an emerging industry that uses technology to improve activities in finance. For example, Fintech enables financial services to be more accessible to the general public with the use of mobile devices such as smartphones for mobile banking, investing, borrowing services, cryptocurrency, etc.

DETAILED DESCRIPTION

Implementations described herein enable, facilitate, and manage a banking kit that enables a customer to access a cloud account and to initiate financial transactions via the cloud account.

Conventionally, customer data is stored in a common database, and banking services are provided to serve customer requests. To meet growing customer traffic demands, backend servers need to be scaled up to provide a better customer experience. Because all financial data is stored in a common place, it is crucial that security and management of servers are required to be kept up-to-date, which is cumbersome. External financial technology (fintech) applications can be integrated via application programming interfaces (APIs), but such APIs need to be served with the help of common middleware services. Unfortunately, powerful tools are required to analyze and to provide recommendations when all customer data is stored in one single database.

Implementations described herein address these issues and provide various other benefits. As described in more detail herein, a system enables the building of fintech applications by leveraging financial data stored within individual cloud accounts. Implementations provide a banking kit that improves the customer experience by leveraging the data on a network edge (e.g., at a customer/end user mobile device). The banking kit reduces the number of network calls to backend servers by leveraging the account-level metadata to validate banking rules associated with amount limits, account transfer eligibility, etc. The banking kit also avoids storing customer's financial data in the common database. The banking kit also provides recommendations based on the data stored in end user's cloud account within the mobile device.

As described in more detail herein, in various implementations, a system creates at least one cloud account of multiple cloud accounts. In example implementations described herein, the cloud account is associated with an end user. In practice, the system creates multiple cloud accounts for multiple end users. The system stores user data associated with the end user in a database associated with the end user. The system further enables a client device associated with the end user to access the cloud account. From such access, the system enables the end user to initiate financial transactions using the client device. Furthermore, the system enables one or more banking services to access the cloud account via the bank server and perform operations such as validating financial transactions initiated by the end user, performing final settlements associated with the financial transactions, maintaining a ledger associated with financial transactions, performing audit trails associated with financial transactions, etc. The system enables such user transactions for multiple users and banking service operations for multiple banking services.

Figure 1:
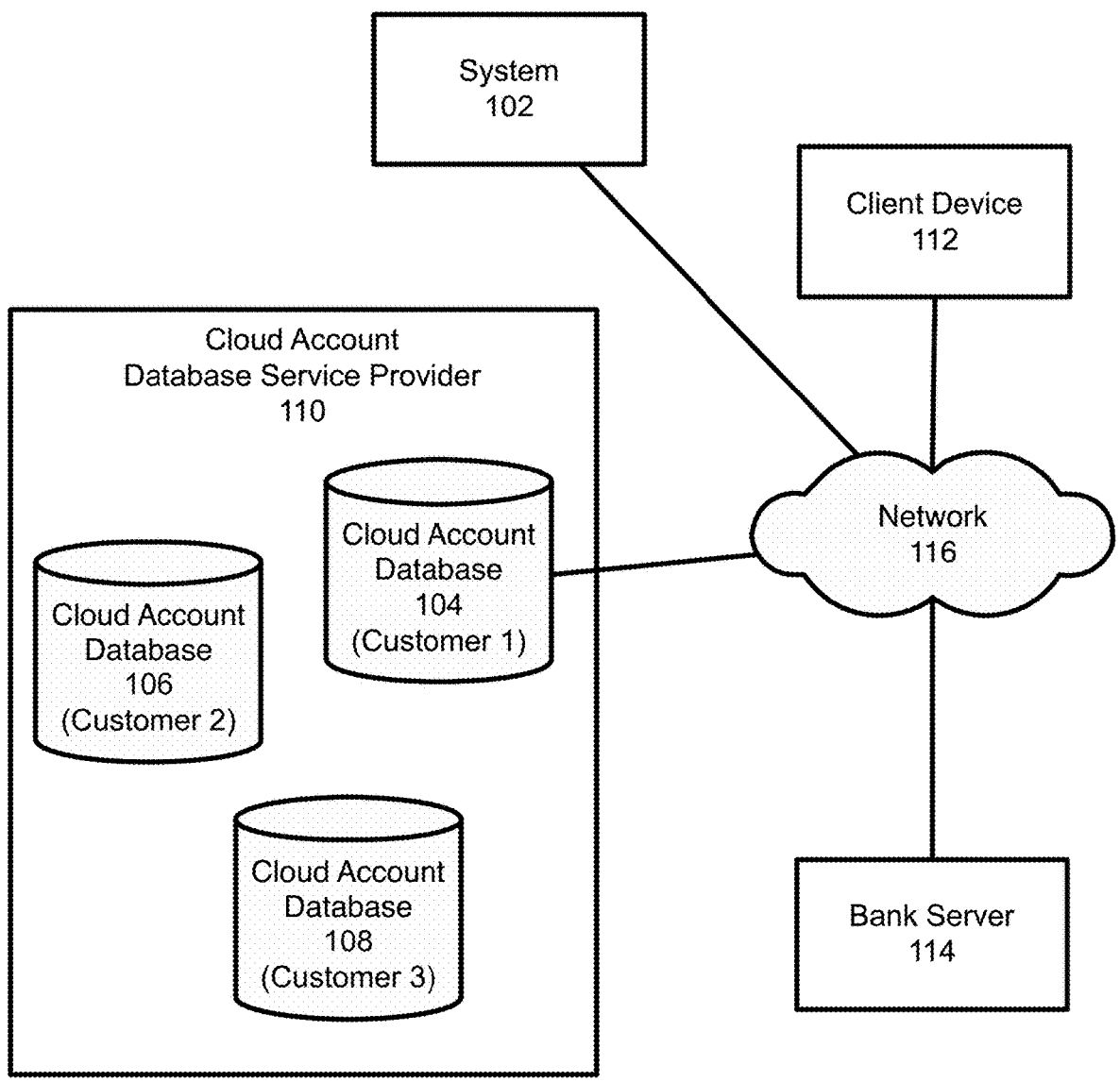
FIG. 1 is a block diagram of an example environment for implementing a banking kit, which may be used for implementations described herein.

FIG. 1 is a block diagram of an example environment 100 for implementing a banking kit, which may be used for implementations described herein. As shown, environment 100 includes a system 102, a cloud account database 104, a cloud account database 106, a cloud account database 108, a cloud account database service provider 110, a client device 112, a bank server 114, and a network 116. As shown, cloud account database 104, cloud account database 106, and cloud account database 108 are associated with cloud account database service provider 110, which may be used to provision cloud account databases 104, 106, and 108. As described in more detail herein, cloud account database 104, cloud account database 106, and cloud account database 108 are separate databases, where each database is associated with a separate and unique customer. For example, in this particular implementation, cloud account database 104 is associated with a Customer 1, cloud account database 106 is associated with a Customer 2, and cloud account database 108 is associated with a Customer 3. For ease of illustration, three cloud account databases are shown. The number of cloud account databases may vary, depending on the particular implementation.

For ease of illustration, various example implementations are described herein in the context of client device 112 and bank server 114 accessing a single cloud account database 104. In these example implementations, client device 112 and cloud account database 104 are associated with a single customer (e.g., Customer 1). There may be other scenarios where a client device (not shown) and bank server 114 or another bank server (not shown) access a different cloud account database such as cloud account database 106 associated with different customer such as Customer 2, etc.

In various implementations, each of the cloud account databases are independent and an isolated cloud datastore/database available for access to both mobile devices and bank servers independently. In various implementations, cloud account database service provider 110 is a type of service provider that hosts multiple cloud account databases (one per customer). As described in more detail herein, a client device (e.g., a customer's mobile device) with a bank app (embedded with the banking kit) is able to interact directly with a respective cloud account database (dedicated for the customer). The same account is accessible by the respective bank server to further process transactions. After provisioning a given cloud account database for a given customer, the mobile app on the client device utilizes the banking kit for direct access to the cloud account database. The same applies to bank servers, where a given bank server may directly fetch data from the customer's respective cloud account database. In various implementations, the bank server may pull data from customer's cloud account database based on a trigger from a user's client device.

In various implementations, system 102 communicates with cloud account databases 104, 106, and 108, cloud account database service provider 110, client device 112, and bank server 114 directly or via network 116. Network 116 may be any suitable communication network such as a Wi-Fi network, Bluetooth network, the Internet, etc., or combination thereof.

In various implementations, system 102 implements a banking kit on using cloud account databases 104, 106, and 108. System 102 also implements the banking kit on client devices such as client device 112 and on bank server devices such as bank server 114. In various implementations, software components of the banking kit reside on system 102, on client device 112, on bank server 114, and on other client devices and bank servers associated with system 102. In various implementations, the banking kit is integrated with native applications on client devices such as on client device 112. The banking kit provides the ability to store and manage end user/customers' financial data on their own cloud account in a secure format. As described in more detail herein, a user interface of a mobile application on a user's client device (e.g., mobile phone) retrieves the data from the customer's own cloud account and then submits a transaction trigger to the bank server 114. In the background, bank services associated with the bank server access the cloud account and provide updates. Validations, analytics, and recommendations run within the banking kit by utilizing the data from the cloud account.

Implementations establish protocols and APIs between the banking kit and the bank server 114, which enable third-party banks such as startup banks to leverage existing and trustworthy banking services. The banking kit provides an enhanced customer experience, where payment validations such as balance checks, duplicates, limits validations, etc. may be performed in real-time on the end user's client device 112. The banking kit on client device 112 generates analytics and recommendations with cloud account data by considering the inputs from banking services such as a banking service associated with bank server 114.

The banking kit of system 102 stores user accounts and payment data within the end user's cloud account. Implementations, achieve decentralized data of accounts by creating a cloud account for each customer, and securely store and validate the data and financial transactions in the cloud accounts. Implementations share access of cloud accounts for both client devices (e.g., mobile devices, etc.) and back-end banking services. As described in more detail herein, to protect the privacy of the data and to maintain data integrity, data modifications are validated and may be achieved with a secure session token and blockchain mechanism. Banking services validate the data before reading and updating the data in the cloud account.

The banking kit provides financial information on individual cloud accounts, which are accessible offline. The system securely stores data associated with an end user's financial transaction in a cloud account as a personal ledger format, and also leverages a blockchain mechanism to maintain the integrity of the data. In various implementations, cloud accounts are accessible to the customer and to the bank with the help of authorized tokens. Banking services read financial transaction details from each cloud account and post the transactions to respective financial institutions with established methods of settlement modes and with the help of existing clearinghouses. In various implementations, the banking kit may be extended for startup companies to build fintech applications by leveraging the banking kit and providing payment services.

For ease of illustration, FIG. 1 shows one block for each of system 102, cloud account databases 104, 106, and 108, client device 112, and bank server 114. Blocks 102-114 may each represent multiple respective systems, cloud account databases, cloud account database service providers, client devices, and bank servers. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

For ease of illustration, system 102 is shown as being separate from cloud account database service provider 110, cloud account databases 104, 106, and 108, client device 112, and bank server 114. In various implementations, some elements such as cloud account database service provider 110 and cloud account databases 104, 106, and 108 may be integrated with system 102. Also, some bank servers such as bank server 114 may be integrated with system 102. Other bank servers (not shown), may be integrated with system 102 or may be remote to system 102. Some bank servers remote to system 102 may include bank servers owned and operated by the same bank that owns and operates system 102. Some bank servers remote to system 102 may include bank servers owned and operated by third-party banks or other third-party financial-related businesses.

Figure 2:
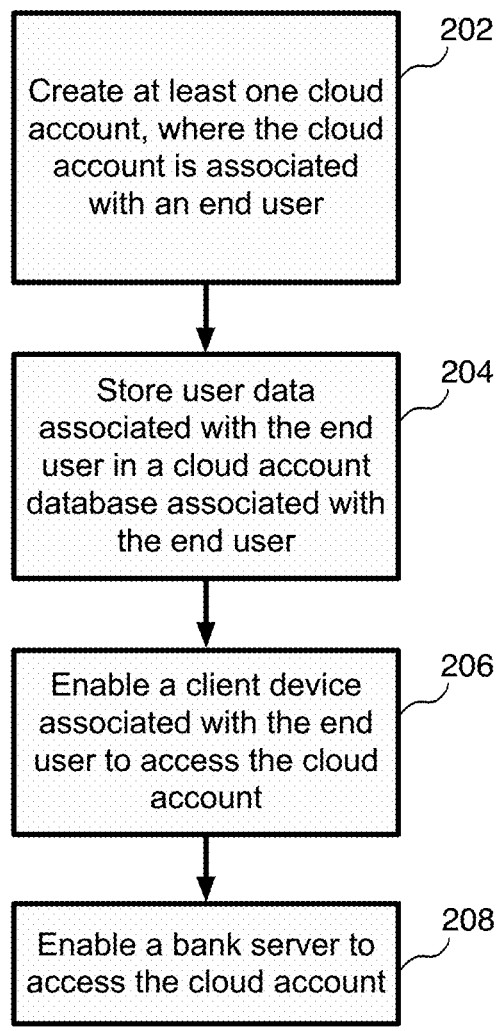
FIG. 2 is an example flow diagram for implementing a banking kit, according to some implementations.

FIG. 2 is an example flow diagram for implementing a banking kit, according to some implementations. Referring to both FIGS. 1 and 2, a method is initiated at block 202, where a system such as system 102 creates at least one cloud account of multiple of multiple cloud accounts, where the cloud account is associated with an end user. In various implementations, the system creates multiple cloud accounts for multiple end users. For example, the system may create thousands or millions of cloud accounts for multiple end users. Also, in some implementations, the system may create multiple cloud accounts for a single user. For example, there may be some instance where a given user has two cloud accounts. For ease of illustration, various example implementations are described herein in the context of a single cloud account for a single end user. In various implementations, such accounts may be created in association with a cloud account database service provider such as cloud account database service provider 110.

At block 204, system 102 stores user data associated with the end user in a cloud account database such as cloud account database 108 associated with the end user. The system stores the accounts and payments data within the customer's cloud account. The system decentralizes user data by utilizing a cloud account for each end user, and securely stores and validates the data in each cloud account. In various implementations, the cloud account database may be associated with a cloud account database service provider such as cloud account database service provider 110.

At block 206, system 102 enables a client device such as client device 112 associated with the end user to access the cloud account. As described in more detail below in connection with FIG. 3, for example, the banking kit of system 102 enables the end user/customer to initiate financial transactions from client device 112.

At block 208, system 102 enables a bank server such as bank server 114 to access the cloud account. To protect the privacy of user data and maintain data integrity, the system enables banking services to validate data modifications, which may be performed with a secure session token and blockchain mechanism. In various implementations, banking services validate data before reading and updating data in the cloud account.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
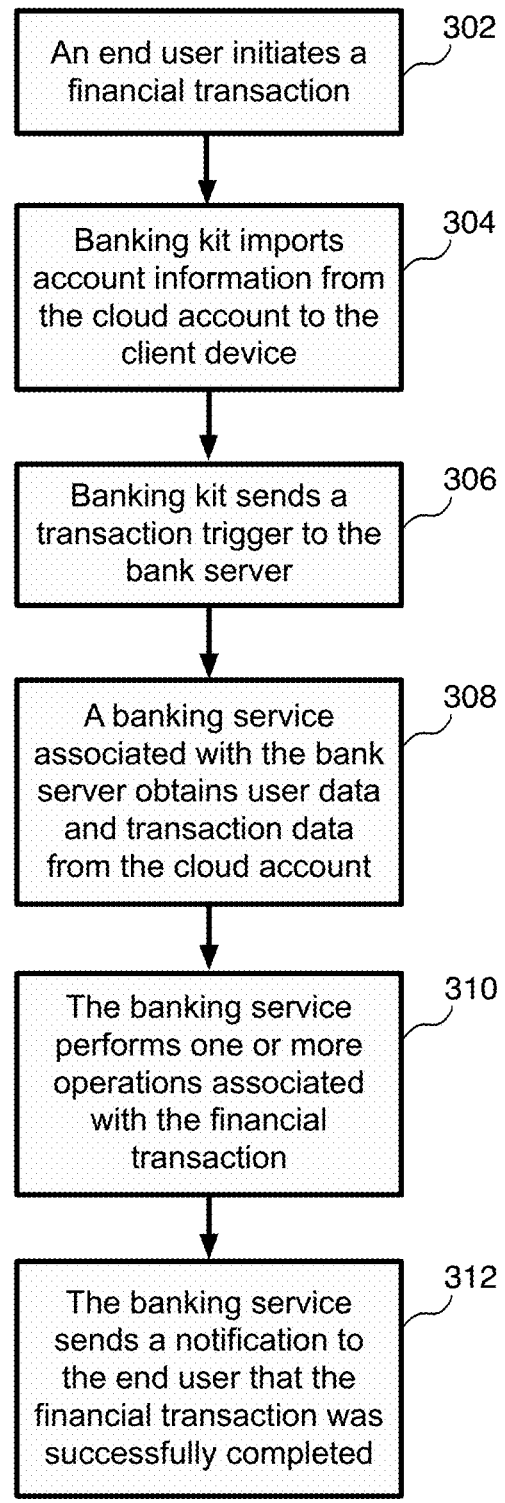
FIG. 3 is an example flow diagram for implementing a banking kit, according to some implementations.

FIG. 3 is an example flow diagram for implementing a banking kit, according to some implementations. In various implementations, the system enables the end user to initiate financial transactions using the client device. In various implementations, the following steps and associated implementations are enabled by a system such as system 102 of FIG. 1. As described in more detail below, the system enables user-initiated financial transactions such as account-to-account (A2A) transfers. In various implementations, the flow diagram of FIG. 3 presumes that the onboarding of the cloud account is complete, and that the account related information is readily available in the cloud account to initiate financial transactions. As described in more detail herein, the bank service accesses the cloud account and validates the secure session token and related information for authenticity of the newly created block along with validating the entire chain. Once the validation is complete, bank-service will communicate information about the transaction details to respective downstream services (treasury/clearinghouses). Once the transaction reaches its final state, bank-service will create a new block with updated account and payment/transfer information and will initiate a notification to the customer about the successful completion of the transaction.

Referring to both FIGS. 1 and 3, a method is initiated at block 302, where an end user initiates a financial transaction using the end user's client device 112. In various implementations, when the end user initiates a financial transaction, client device 112 accesses the user data from the cloud account at cloud account database service provider 110.

As indicated herein, the banking kit enables the end user to access the user's cloud account via a native application on client device 112 (e.g., mobile device). In various implementations, the banking kit may be integrated into the native app on the client device 112.

Figure 4:
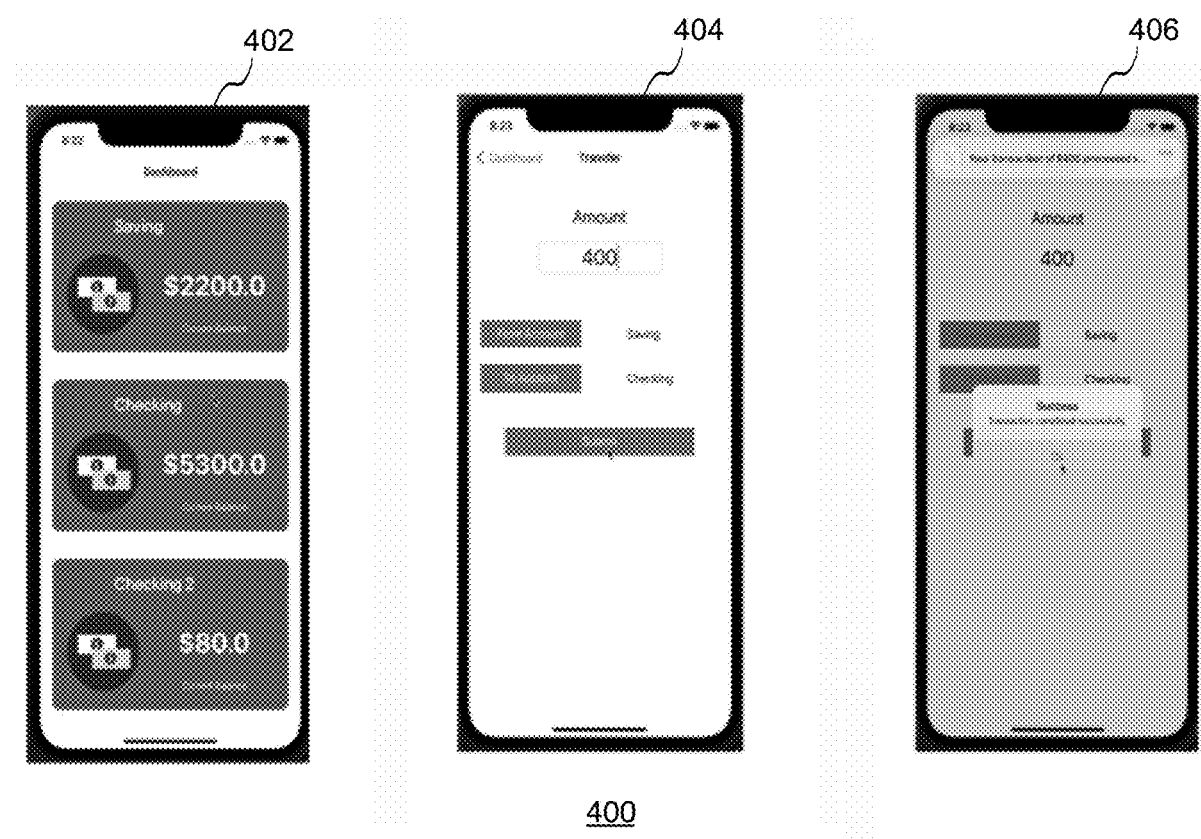
FIG. 4 illustrates example iOS user interfaces for implementing a banking kit, according to some implementations.

FIG. 4 illustrates example iOS user interfaces for implementing a banking kit, according to some implementations. Shown are a dashboard user interface 402, a transaction user interface 404 (labeled "Transfer"), and a confirmation user interface 406. Dashboard user interface 402 shows information associated with a savings account and two checking accounts. In various implementations, these accounts are associated with an end user and also associated with the cloud account of the end user. Transaction user interface 404 shows an example financial transaction, where $400 is to be transferred from a savings account to a checking account. Confirmation user interface 406 shows an example confirmation that $400 was successfully transferred from the savings account to the checking account.

Figure 5:
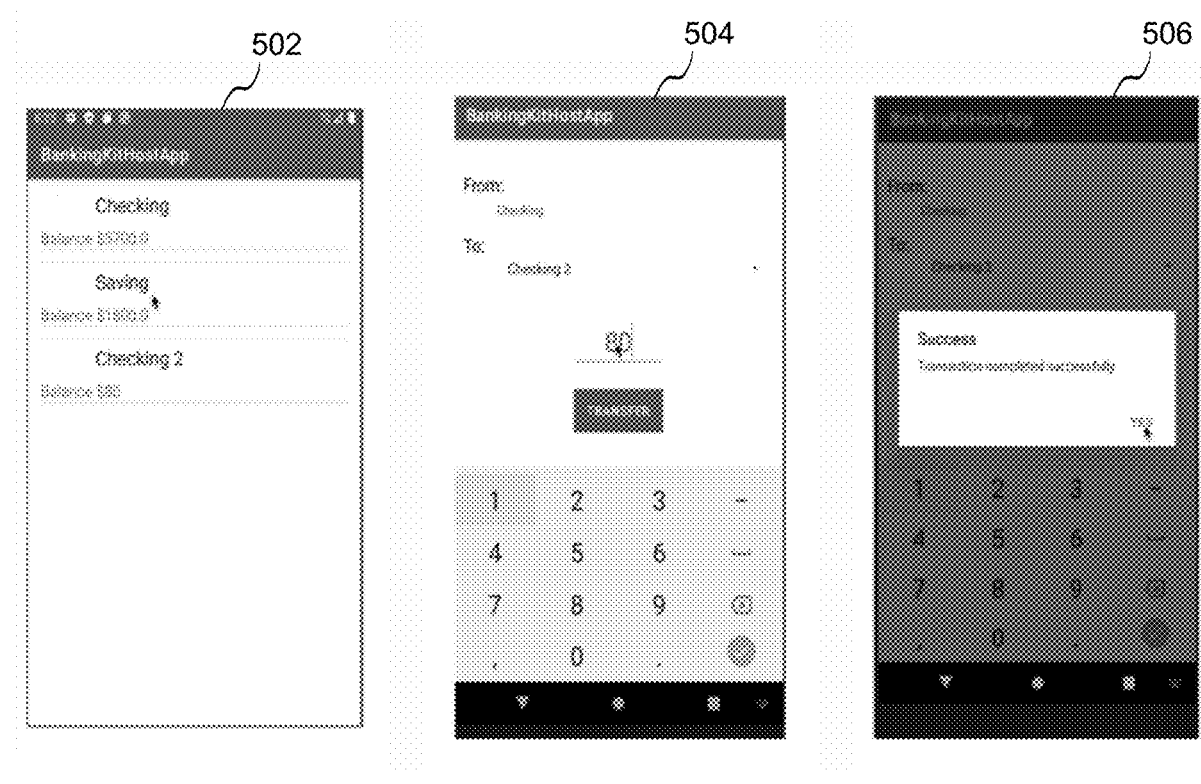
FIG. 5 illustrates example Android user interfaces for implementing a banking kit, according to some implementations.

FIG. 5 illustrates example Android user interfaces for implementing a banking kit, according to some implementations. Shown are a dashboard user interface 502, a transaction user interface 504, and a confirmation user interface 506. Dashboard user interface 502 shows information associated with a savings account and two checking accounts. In various implementations, these accounts are associated with an end user and also associated with the cloud account of the end user. Transaction user interface 504 shows an example financial transaction, where $80 is to be transferred from a checking account to another checking account. Confirmation user interface 506 shows an example confirmation that the transfer from one checking account to the other checking account was successful.

At block 304, in association with the financial transaction, and after authenticating and authorizing the end user, the banking kit of system 102 imports account information from the cloud account at cloud account database service provider 110 to client device 112. The banking kit may also import other required account data and payments data from the cloud account. As described in more detail herein, the banking kit also creates a payment block by performing required preliminary checks. In various implementations, after the end user initiates the financial transaction, client device 112 sends transaction data associated with financial transactions initiated by the end user to the cloud account via cloud account database service provider 110.

At block 306, the banking kit of system 102 sends a transaction trigger to a bank server such as bank server 114. In various implementations, the client device sends transaction triggers to a bank service via bank server 114 in response to the financial transactions initiated by the end user.

The banking kit leverages background processes to initiate the transaction trigger and subsequently refresh and synchronize the data between the local data store (e.g., the database associated with the cloud account server) and the cloud account. As described in more detail herein, the banking kit creates authorized tokens to access the cloud account. The banking kit is self-sufficient to validate the validity of the transactions stored in the blockchain format.

At block 308, a banking service associated with bank server 114 obtains user data and transaction data from the cloud account at cloud account database service provider 110. In various implementations, the system enables a banking service to access the cloud account via bank server 114 in response to bank server 114 receiving the transaction trigger from client device 112 (e.g., from the banking kit). In various implementations, the bank service may access the user data and transaction data associated with financial transactions in response to the transaction trigger. In various implementations, after banking services access the cloud account via bank server 114, the system enables the banking services to perform a variety of banking services based on access to the cloud account of the end user.

At block 310, the banking service performs one or more operations associated with the financial transaction. Such operations may be performed at bank server 114. In various implementations, system 102 enables the banking service and/or other banking services to perform operations such as validating financial transactions initiated by the end user, performing final settlements associated with the financial transactions, maintaining a ledger associated with financial transactions, performing audit trails associated with financial transactions, etc. For example, in some implementations, the system may enable a given banking service to validate financial transactions initiated by the end user via the cloud account. In some implementations, the system may enable a given banking service to perform final settlements associated with the financial transactions that were initiated by the end user via the cloud account. In some implementations, the system may enable a given banking service to maintain a ledger associated with financial transactions initiated by the end user that were initiated by the end user via the cloud account. In some implementations, the system may enable a given banking service to perform audit trails associated with financial transactions initiated by the end user that were via the cloud account.

At block 312, the banking service sends a notification to the end user that the financial transaction was successfully completed. More particularly, bank server 114 associated with the banking service sends the notification to the end user's client device 112 for the end user to view.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 6:
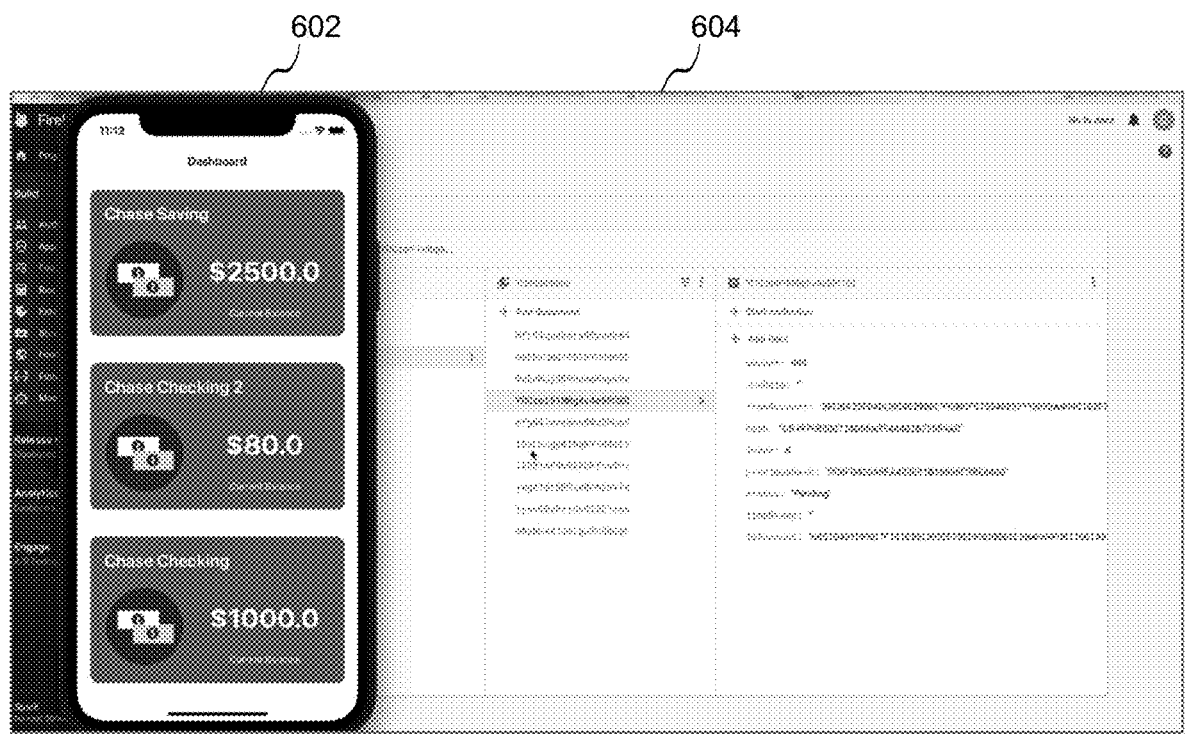
FIG. 6 illustrates an example screenshot of a user interface showing blockchain information, according to some implementations.

FIG. 6 illustrates an example screenshot of a user interface 600 showing blockchain information, according to some implementations. Shown is a dashboard user interface 602 and blockchain information 604. In various implementations, the system secures, using blockchain technology, transaction data associated with financial transactions initiated by the end user. In various implementations, the cloud account provides a data store for the individual end user. Also, the cloud account may be accessed by the client device and the same may be accessed from the backend banking service to access and update the cloud account and financial transaction information. The banking kit leverages the blockchain to store each payment and associated account information in a separate block in order to maintain data integrity. In various implementations, the banking kit stores metadata associated with the cloud account in the appropriate cloud account. Such metadata may include, for example, account type, account constraints, account limits, validations of payment limits, daily limits, warnings for duplicate payments, etc.

Figure 7:
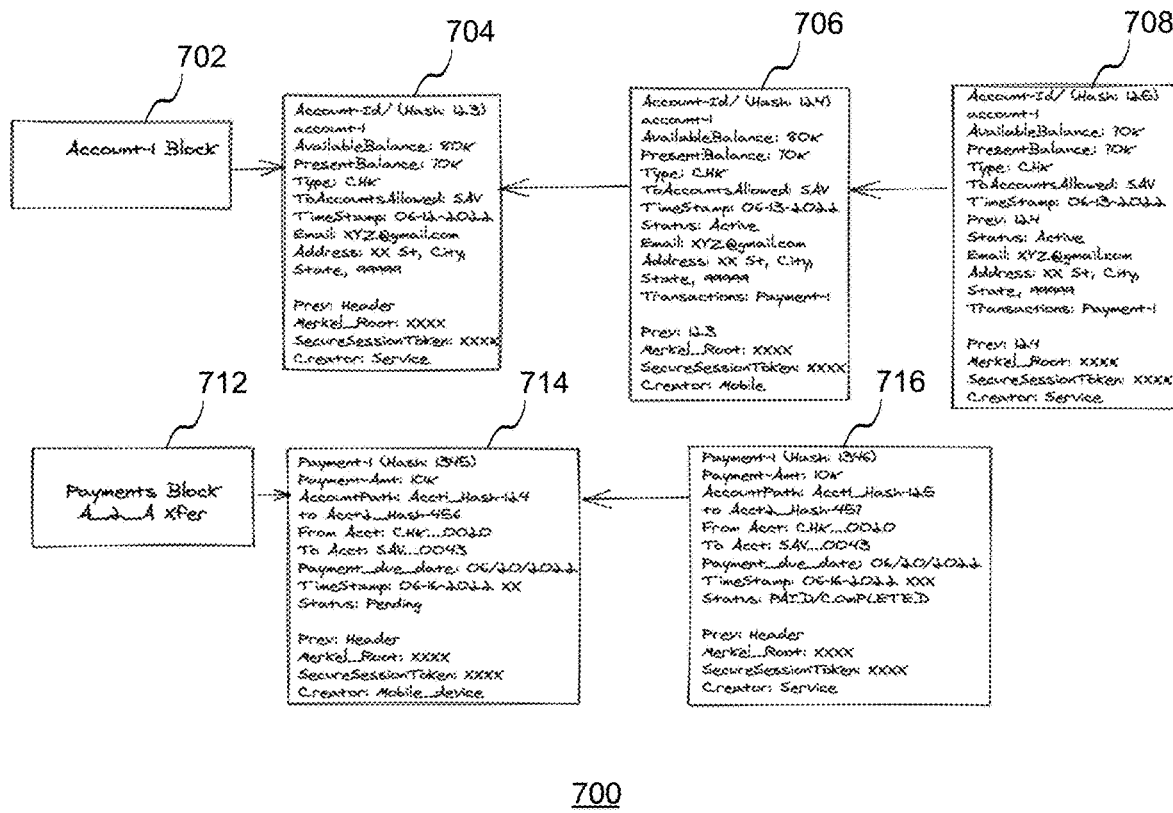
FIG. 7 illustrates an example screenshot of a user interface showing blockchain information, according to some implementations.

FIG. 7 illustrates an example screenshot of a user interface 600 showing blockchain information, according to some implementations. Shown are an account block 702 and associated account block journeys or ledgers 704, 706, and 708. Also shown are payments block 712 and associated payments block journeys or ledgers 714, and 716. As indicated herein, when the banking service receives the transaction trigger associated with the financial transaction from the banking kit (e.g., from the client device), and the backend banking service leverages the authorization token. The banking service utilizes the authorized token to access the cloud account. In various implementations, the banking kit ensures data integrity using a separate, secure session token to validate details of the financial transaction in the block.

Implementations described herein provide various benefits. For example, implementations of the banking kit open the doors for building applications with better end user/customer experience. Leveraging capabilities of powerful native applications reduces back and forth API calls with backend services. Individual cloud accounts for financial data and transactions enable many opportunities for personalization, analytics, and recommendations.

Figure 8:
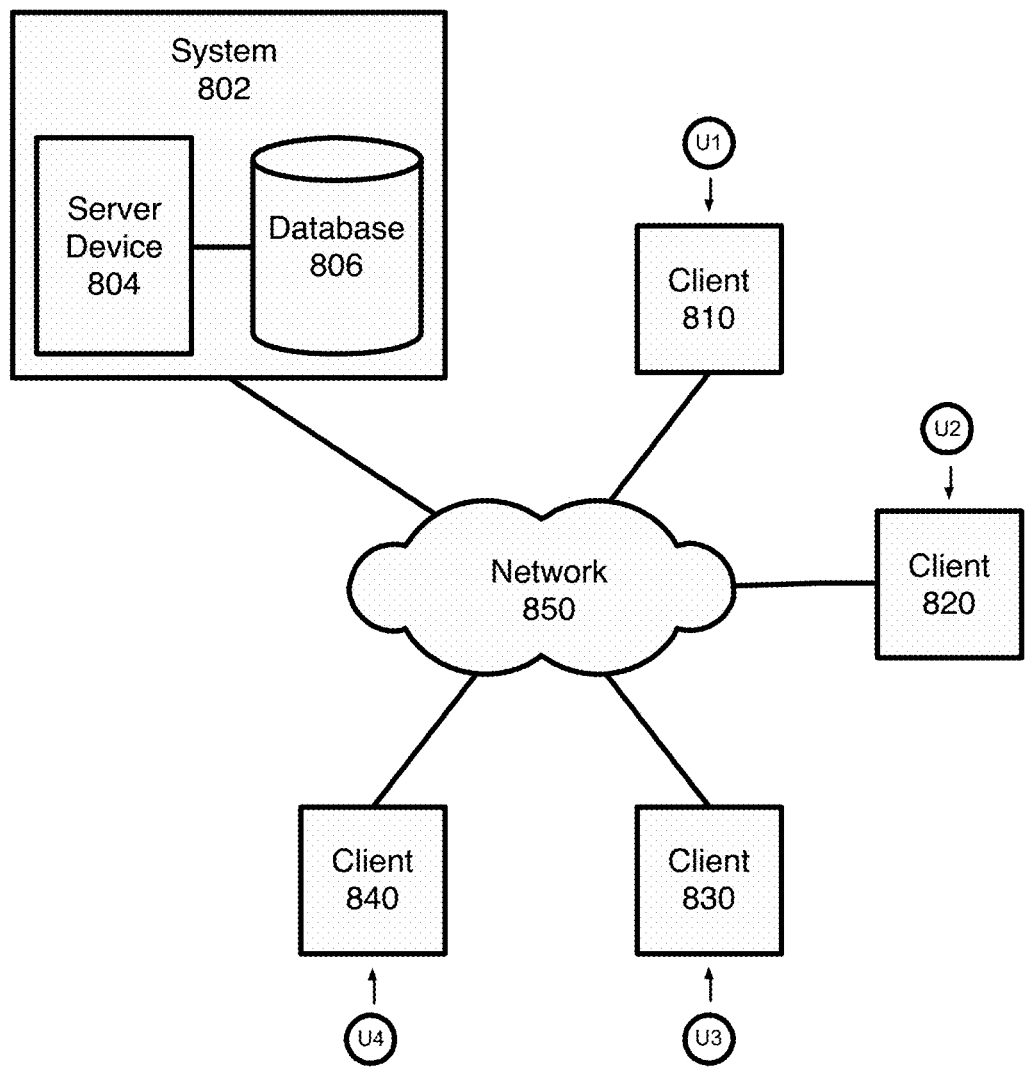
FIG. 8 is a block diagram of an example network environment, which may be used for some implementations described herein.

FIG. 8 is a block diagram of an example network environment 800, which may be used for some implementations described herein. In some implementations, network environment 800 includes a system 802, which includes a server device 804 and a database 806. For example, system 802 may be used to implement system 102 of FIG. 1, as well as to perform implementations described herein. Network environment 800 also includes client devices 810, 820, 830, and 840, which may communicate with system 802 and/or may communicate with each other directly or via system 802. Network environment 800 also includes a network 850 through which system 802 and client devices 810, 820, 830, and 840 communicate. Network 850 may be any suitable communication network such as a Wi-Fi network, Bluetooth network, the Internet, etc.

For ease of illustration, FIG. 8 shows one block for each of system 802, server device 804, and network database 806, and shows four blocks for client devices 810, 820, 830, and 840. Blocks 802, 804, and 806 may represent multiple systems, server devices, and network databases. Also, there may be any number of client devices. In other implementations, environment 800 may not have all of the components shown and/or may have other elements including other types of elements instead of, or in addition to, those shown herein.

While server device 804 of system 802 performs implementations described herein, in other implementations, any suitable component or combination of components associated with system 802 or any suitable processor or processors associated with system 802 may facilitate performing the implementations described herein.

In the various implementations described herein, a processor of system 802 and/or a processor of any client device 810, 820, 830, and 840 cause the elements described herein (e.g., information, etc.) to be displayed in a user interface on one or more display screens.

Figure 9:
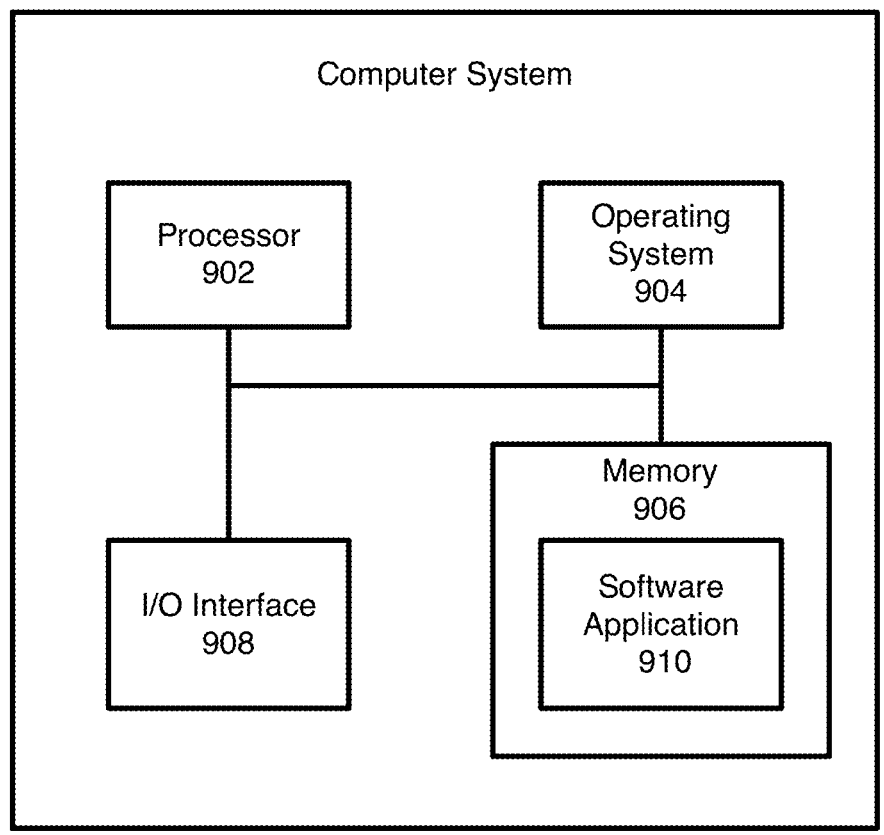
FIG. 9 is a block diagram of an example computer system, which may be used for implementations described herein.

FIG. 9 is a block diagram of an example computer system 900, which may be used for some implementations described herein. For example, computer system 900 may be used to implement server device 804 of FIG. 8 and/or system 102 of FIG. 1, as well as to perform implementations described herein. In some implementations, computer system 900 may include a processor 902, an operating system 904, a memory 906, and an input/output (I/O) interface 908. In various implementations, processor 902 may be used to implement various functions and features described herein, as well as to perform the method implementations described herein. While processor 902 is described as performing implementations described herein, any suitable component or combination of components of computer system 900 or any suitable processor or processors associated with computer system 900 or any suitable system may perform the steps described. Implementations described herein may be carried out on a user device, on a server, or a combination of both.

Computer system 900 also includes a software application 910, which may be stored on memory 906 or on any other suitable storage location or computer-readable medium. Software application 910 provides instructions that enable processor 902 to perform the implementations described herein and other functions. Software application 910 may also include an engine such as a network engine for performing various functions associated with one or more networks and network communications. The components of computer system 900 may be implemented by one or more processors or any combination of hardware devices, as well as any combination of hardware, software, firmware, etc.

For ease of illustration, FIG. 9 shows one block for each of processor 902, operating system 904, memory 906, I/O interface 908, and software application 910. These blocks 902, 904, 906, 908, and 910 may represent multiple processors, operating systems, memories, I/O interfaces, and software applications. In various implementations, computer system 900 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C #, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (Saas) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
creating at least one cloud account of a plurality of cloud accounts associated with a plurality of users, wherein the at least one cloud account is associated with an end user;
storing user data associated with the end user in a database associated with the end user;
enabling a client device associated with the end user to access the cloud account;
enabling a banking service to access a bank server to access the cloud account in response to the bank server receiving a transaction trigger from the client device, wherein the enabling of the banking service to access the bank server is performed using a token and a blockchain mechanism; and
enabling the client device to display a user interface for accessing the at least one cloud account associated with the end user, wherein the user interface allows the end user to perform a plurality of functions associated with the at least one cloud account,
wherein the client device sends transaction data associated with financial transactions initiated by the end user to the at least one cloud account, and
wherein the financial transactions are secured using the blockchain mechanism and each financial transaction and cloud account information are stored in separate blocks of the blockchain mechanism to maintain data integrity.

2. The system of claim 1, wherein the logic when executed is further operable to cause the one or more processors to perform operations comprising enabling the end user to initiate financial transactions using the client device, and wherein the client device accesses the user data from the at least one cloud account.

3. The system of claim 1, wherein the banking service validates financial transactions initiated by the end user.

4. The system of claim 1, wherein the banking service maintains a ledger associated with financial transactions initiated by the end user.

5. The system of claim 1, wherein the banking service performs audit trails associated with financial transactions initiated by the end user.

6. The system of claim 1, wherein the logic when executed is further operable to cause the one or more processors to perform operations comprising securing, using the blockchain mechanism, transaction data associated with financial transactions initiated by the end user.

7. A non-transitory computer-readable storage medium with program instructions stored thereon, the program instructions when executed by one or more processors are operable to cause the one or more processors to perform operations comprising:
   creating at least one cloud account of a plurality of cloud accounts associated with a plurality of users, wherein the at least one cloud account is associated with an end user;
   storing user data associated with the end user in a database associated with the end user;
   enabling a client device associated with the end user to access the cloud account; and
   enabling a banking service to access a bank server to access the cloud account in response to the bank server receiving a transaction trigger from the client device, wherein the enabling of the banking service to access the bank server is performed using a token and a blockchain mechanism; and
   enabling the client device to display a user interface for accessing the at least one cloud account associated with the end user, wherein the user interface allows the end user to perform a plurality of functions associated with the at least one cloud account,
   wherein the client device sends transaction data associated with financial transactions initiated by the end user to the at least one cloud account, and
   wherein the financial transactions are secured using the blockchain mechanism and each financial transaction and cloud account information are stored in separate blocks of the blockchain mechanism to maintain data integrity.

8. The computer-readable storage medium of claim 7, wherein the instructions when executed are further operable to cause the one or more processors to perform operations comprising enabling the end user to initiate financial transactions using the client device, and wherein the client device accesses the user data from the at least one cloud account.

9. The computer-readable storage medium of claim 7, wherein the banking service validates financial transactions initiated by the end user.

10. The computer-readable storage medium of claim 7, wherein the banking service maintains a ledger associated with financial transactions initiated by the end user.

11. The computer-readable storage medium of claim 7, wherein the banking service performs audit trails associated with financial transactions initiated by the end user.

12. The computer-readable storage medium of claim 7, wherein the instructions when executed are further operable to cause the one or more processors to perform operations comprising securing, using the blockchain mechanism, transaction data associated with financial transactions initiated by the end user.

13. A computer-implemented method, the method being implemented by at least one processor, the method comprising:
   creating, by the at least one processor, at least one cloud account of a plurality of cloud accounts associated with a plurality of users, wherein the at least one cloud account is associated with an end user;
   storing, by the at least one processor, user data associated with the end user in a database associated with the end user;
   enabling, by the at least one processor, a client device associated with the end user to access the cloud account;
   enabling, by the at least one processor, a banking service to access a bank server to access the cloud account in response to the bank server receiving a transaction trigger from the client device, wherein the enabling of the banking service to access the bank server is performed using a token and a blockchain mechanism; and
   enabling, by the at least one processor, the client device to display a user interface for accessing the at least one cloud account associated with the end user, wherein the user interface allows the end user to perform a plurality of functions associated with the at least one cloud account,
   wherein the client device sends transaction data associated with financial transactions initiated by the end user to the at least one cloud account, and
   wherein the financial transactions are secured using the blockchain mechanism and each financial transaction and cloud account information are stored in separate blocks of the blockchain mechanism to maintain data integrity.

14. The method of claim 13, further comprising enabling the end user to initiate financial transactions using the client device, wherein the client device accesses the user data from the at least one cloud account.

15. The method of claim 13, wherein the banking service validates financial transactions initiated by the end user.

16. The method of claim 13, wherein the banking service maintains a ledger associated with financial transactions initiated by the end user.

17. The method of claim 13, further comprising securing, using the blockchain mechanism, transaction data associated with financial transactions initiated by the end user.

* * * * *